United States Patent [19]
Slack et al.

[11] Patent Number: 5,837,794
[45] Date of Patent: Nov. 17, 1998

[54] TOLUENE DIISOCYANATE RESIDUE-BASED COMPOSITIONS HAVING REDUCED ACID VALUES

[75] Inventors: William E. Slack; Scott A. Kane; James W. Rosthauser, all of Pittsburgh, Pa.

[73] Assignee: Bayer Corporation, Pittsburgh, Pa.

[21] Appl. No.: 958,282

[22] Filed: Oct. 27, 1997

[51] Int. Cl.$^6$ ..................................... C08G 18/30
[52] U.S. Cl. ..................... 528/49; 528/73; 252/182.22; 524/714; 524/871; 525/458; 521/128
[58] Field of Search .................. 528/73, 49; 252/182.22; 524/714, 871; 525/458; 521/128

[56] References Cited

U.S. PATENT DOCUMENTS

| | | | |
|---|---|---|---|
| 3,455,836 | 7/1969 | Shultz et al. | 252/182 |
| 3,793,362 | 2/1974 | Kolskowski | 260/453 SP |
| 4,293,456 | 10/1981 | Reischl | 260/9 |
| 4,297,456 | 10/1981 | Reischl et al. | 525/452 |
| 4,507,464 | 3/1985 | Rasshofer | 528/288 |
| 4,904,704 | 2/1990 | Nafziger et al. | 521/156 |
| 5,185,384 | 2/1993 | Daussin et al. | 521/160 |
| 5,290,818 | 3/1994 | Nafziger et al. | 521/54 |

*Primary Examiner*—Rachel Gorr
*Attorney, Agent, or Firm*—Joseph C. Gil; Lyndanne M. Whalen

[57] ABSTRACT

TDI residue-based urethane-filled isocyanate compositions are produced by reacting a TDI residue satisfying specified criteria with a monofunctional alcohol in amounts such that the equivalent ratio of isocyanate groups to hydroxyl groups is from about 0.9:1 to about 1:0.9. This reaction product is then dissolved in a diisocyanate or polyisocyanate before, during or after reaction of that product with an epoxide having an epoxide equivalent weight of from about 44 to about 400 at a temperature of up to 120° C. These TDI residue-based urethane-filled isocyanate compositions are particularly useful in the production of polyurethanes.

20 Claims, 1 Drawing Sheet

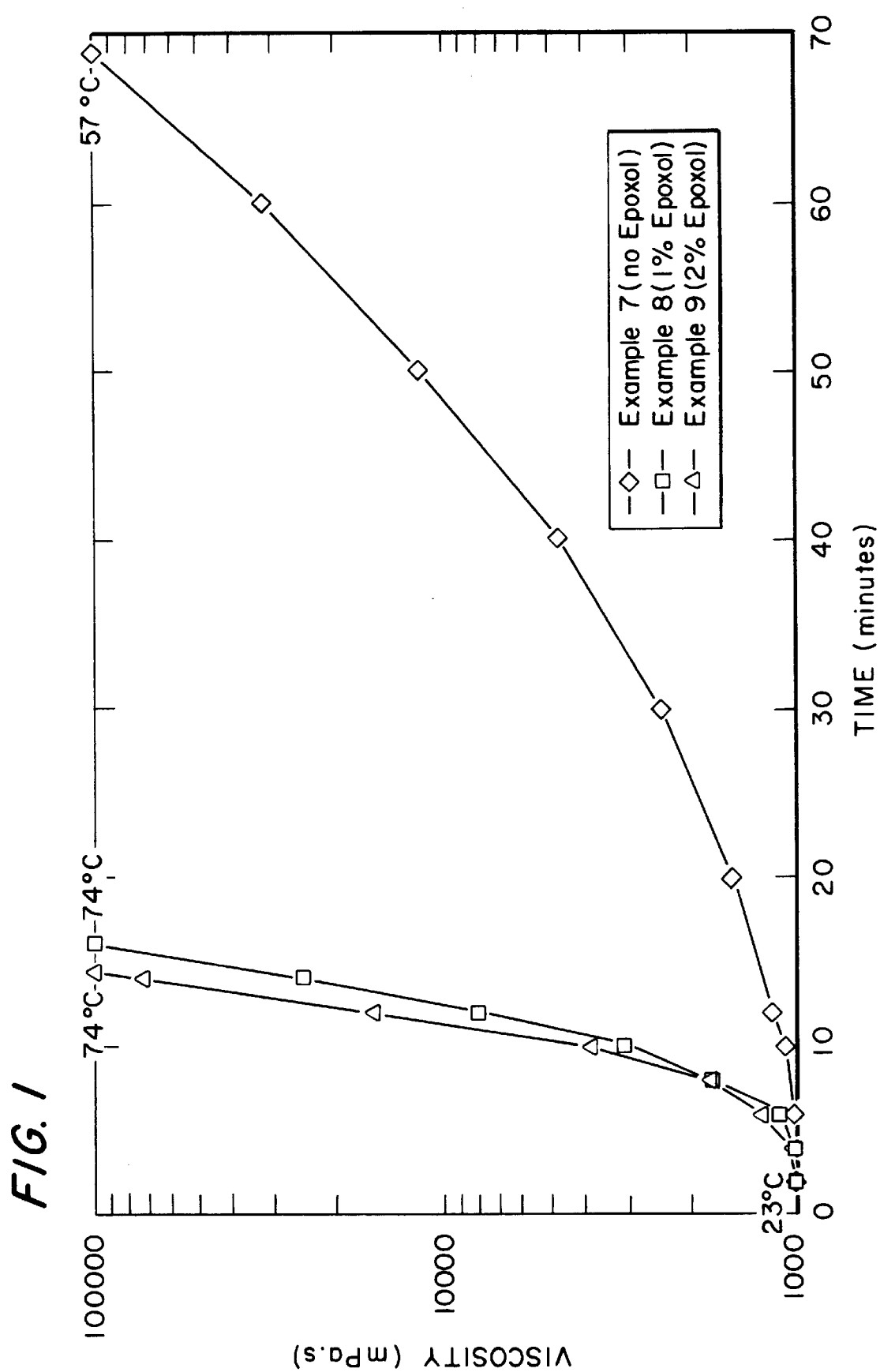

TOLUENE DIISOCYANATE RESIDUE-BASED COMPOSITIONS HAVING REDUCED ACID VALUES

BACKGROUND OF THE INVENTION

The present invention relates to a toluene diisocyanate ("TDI") residue-filled polyisocyanate having reduced acidity levels, to a process for the production of a polyisocyanate filled with a TDI residue-based urethane having a reduced acidity level, to polyurethane prepolymers produced from these urethane filled isocyanates having reduced acidity levels and to polyurethanes produced from polyisocyanates filled with TDI residue-based urethanes having reduced acidity levels.

TDI is generally produced by phosgenating toluene diamine ("TDA"). In the course of producing TDI by this process, a non-distillable by-product which is commonly referred to as "TDI residue" or "TDI bottoms" is generated. The amount of this by-product generated during phosgenation is dependent upon the amount of ortho-toluene diamine ("o-TDA") present in the amine starting material and the phosgenation conditions. Major concerns in the production of TDI are, therefore, the amount of TDI residue generated and whether such TDI residue is useful in other applications.

The usefulness of a TDI residue is largely dependent upon the heat history of that residue. That is, the longer the residue has been subjected to high heat to remove monomeric TDI, the more difficult it becomes to work with that by-product. It has generally been found that after the TDI monomer content of the TDI residue has been reduced to a level below 10%, the remaining residue is a solid at ambient temperature and is insoluble in the commonly used solvents. Consequently, TDI residues containing less than 10% monomeric TDI are not generally considered useful and are disposed of by incineration.

The desirability of using the large quantities of TDI residue generated during TDI production is evident from the prior art.

U.S. Pat. No. 3,455,836, for example, teaches addition of TDI residue to 4,4'-diphenylmethane diisocyanate which has been heated to a temperature high enough to liquify the normally solid material to produce a stable isocyanate composition having a low viscosity at room temperature.

U.S. Pat. No. 4,293,456 teaches that use of finely ground solid TDI residue as a reactive filler which is substantially free of monomeric TDI (i.e., generally contains from 1 to 10% monomeric TDI) may be used to produce polyurethane plastics. This process thus makes it possible to recycle the previously unusable TDI residue and to improve the mechanical properties of plastics made with that finely ground residue. The TDI residue used in this process may be water quenched and denatured or chemically modified by reaction with carbonyl compounds, compounds reactive to isocyanate groups, or carbodiimide groups. The TDI residue must, however, be size reduced to less than 3 mm before it can be used.

U.S. Pat. No. 4,297,456 also teaches that TDI residue which is substantially free of monomeric TDI (i.e., contains less than 7.5% monomeric TDI) and insoluble in organic solvents may be used in the production of molded articles and elastomers if that TDI residue is first comminuted to a mean particle size of less than 800 μu. This TDI residue may be modified during or after grinding by reaction with water, an amine, ammonia, a compound containing hydroxyl groups or a compound containing carboxyl groups.

U.S. Pat. No. 4,507,464 teaches that a liquid isocyanate residue may be obtained by phosgenating a primary polyamine such as TDA in the presence of a compound selected from a specified group and having at least one primary or secondary alcoholic hydroxyl group. The amine and hydroxyl-group containing compound are used in quantities such that the equivalent ratio of primary amino groups to hydroxyl groups is from 1:0.005 to 1:0.99 during the phosgenation. The residue remaining after the desired isocyanate prepolymer has been removed is a liquid.

U.S. Pat. No. 4,904,704 discloses a method for treating TDI with an epoxy compound at temperatures of from about 155° to about 220° C. in order to obtain a material useful for the production of polyurethane foams. The reported reduction in hydrolyzable chloride level is not, however, achieved if the mixture is not subjected to these elevated temperatures. Also, the treated TDI can not be stored at ambient temperature without solidifying. The treated TDI may be diluted with another polyisocyanate prior to use in the production of foams in order to adjust the viscosity of the isocyanate.

U.S. Pat. No. 5,185,384 discloses a method for reducing the hydrolyzable chloride content in TDI and TDI distillation bottoms in which crude TDI is heated to cause at least partial reflux and/or partial fractionation under conditions sufficient to reduce hydrolyzable chloride. The TDI distillation bottoms may then be used directly in the production of polyurethanes or they may be combined with another polyisocyanate prior to production of a polyurethane.

U.S. Pat. No. 3,793,362 teaches that the hydrolyzable chloride content of polymethylene polyisocyanates may be reduced by adding a monomeric epoxide compound to the polyisocyanate in an amount such that from about 0.25 to about 1.0 epoxy equivalents of epoxide is present for each equivalent of acid.

U.S. Pat. No. 5,290,818 discloses a process for producing rebond foam in which the binder includes TDI distillation bottoms having a monomeric TDI content of from 20 to 30%.

It would be advantageous to develop a method for making TDI distillation residue sufficiently soluble in polyisocyanates that it could be made a liquid at ambient temperature without leaving economically impractical amounts of monomeric TDI in that residue which polyisocyanate would have sufficiently low hydrolyzable chloride content that it could be used directly in the production of polyurethane and polyisocyanurate foams.

SUMMARY OF THE INVENTION

It is an object of the present invention to provide a polyisocyanate filled with a TDI residue-based urethane which is storage stable at ambient temperature and which has a reduced acid value.

It is also an object of the present invention to provide a method for producing a liquid TDI residue-based urethane filled polyisocyanate having a reduced acid value.

It is another object of the present invention to provide a liquid, clear, urethane-filled polyisocyanate which has been produced from TDI residue with a reduced acid value.

It is an additional object of this invention to provide a clear, liquid urethane-filled polyisocyanate prepolymer which has been produced from TDI residue having a reduced acid value.

It is a further object of the present invention to provide a process for producing polyurethanes, particularly polyurethane foams, from a liquid, clear, urethane-filled polyisocyanate that has been produced from TDI residue having a reduced acid value.

These and other objects which will be apparent to those skilled in the art are accomplished by selecting a TDI residue generated by phosgenation of TDA in which the o-TDA content was less than 0.5% by weight. The TDI residue to be used in the present invention also contains at least 10% by weight monomeric TDI. The total NCO content of monomeric TDI and any other isocyanate-group containing material present in the TDI residue is at least 20%. TDI residue satisfying these criteria and a monofunctional alcohol are reacted in amounts such that the equivalent ratio of isocyanate groups to hydroxyl groups is from about 0.9:1.0 to about 1.0:0.9 to produce a urethane group-containing composition that is soluble in inert organic solvents, and in polyisocyanates at ambient temperature. This urethane group containing composition may then be dissolved in a polyisocyanate to produce a urethane-filled, polyisocyanate before, during or after reaction of an epoxide having an epoxide equivalent weight of from about 44 to about 400 with the TDI distillation residue treated with monofunctional alcohol at a temperature of up to 120° C. The product urethane-filled polyisocyanate may then be used to produce urethane filled polyisocyanate prepolymers and polyurethanes.

BRIEF DESCRIPTION OF THE DRAWING

FIG. 1 graphically illustrates the reactivity of urethane-filled isocyanates produced in accordance with the present invention with a specific polyol by plotting increase in viscosity over time.

DETAILED DESCRIPTION OF THE INVENTION

The present invention relates to a TDI residue-based urethane filled polyisocyanate having a reduced acid value, to a process for producing such polyisocyanate, to a process for the production of a urethane-filled polyisocyanate prepolymer and to a process for the production of a polyurethane from such a urethane-filled polyisocyanate. The urethane filled polyisocyanates of the present invention are made by reacting a monofunctional alcohol and a TDI residue satisfying specific criteria in amounts such that the equivalent ratio of isocyanate groups to hydroxyl groups is from about 0.9:1 to about 1:0.9, preferably about 1:1. This reaction product is then reacted with from 0.5 to 20% by weight (based on the weight of the toluene diisocyanate residue/alcohol mixture) of an epoxide either before, during or after dissolution of the alcohol treated TDI residue in a polyisocyanate to produce a urethane-filled polyisocyanate. This urethane-filled polyisocyanate may then be reacted with an isocyanate-reactive compound to produce polyisocyanate prepolymers and polyurethanes.

As used herein, the expression "reduced acid value" is defined as a 30% or more reduction in the acidity of the epoxide treated urethane filled polyisocyanate compound from the acidity of the untreated urethane filled polyisocyanate.

The TDI residues useful in the practice of the present invention must satisfy the following criteria: (1) the residue must have been generated by the phosgenation of toluene diamine in which the o-TDA content was less than 0.5%, preferably less than 0.1%, most preferably about 0% by weight (based on the total weight of toluene diamine); (2) the monomeric TDI content of the TDI residue must be at least 10% by weight (based on the total weight of the TDI distillation residue); and (3) the total isocyanate group content of monomeric TDI and any other isocyanate group containing material present in the TDI residue must be at least 20%.

With respect to the first of these criteria, the o-TDA content of the polyamine to be phosgenated may easily be determined by methods known to those skilled in the art such as gas chromatography. If the o-TDA content of the TDA is greater than 0.5%, the TDA may be treated (e.g., by fractional distillation) to reduce the level of o-TDA to an acceptable level.

The phosgenation of TDA may be carried out by any of the methods known to those skilled in the art. Upon completion of that phosgenation, monomeric TDI is generally removed from the reaction mixture by distillation. In accordance with the present invention, the reaction mixture may be distilled until up to 90% by weight of the monomeric TDI has been removed. The remaining residue which contains at least 10% by weight monomeric TDI, preferably at least 15% but no more than 80% by weight monomeric TDI, and most preferably from about 20 to about 50% by weight monomeric TDI and which has a total NCO content of at least 20%, preferably from about 24 to about 40%, most preferably from about 26 to about 34% is suitable as a starting material for the process of the present invention. It is preferred, but not required, that any solvent employed in the phosgenation process be removed prior to use of the TDI residue in accordance with the present invention.

Any of the known monofunctional alcohols (i.e., compounds containing one alcoholic hydroxyl group) may be reacted with the TDI residue satisfying the criteria of the present invention. Such monofunctional alcohols generally have a molecular weight of from about 32 to about 1,000, preferably from about 60 to about 400. Suitable monofunctional alcohols include compounds having a carbon backbone such as cetyl alcohol (16 carbons) as well as compounds which contain groups that will not react with isocyanate groups such as ether linkages, tertiary amines, chlorine, bromine, etc. Mixtures of such monofunctional alcohols may also be used.

Examples of suitable monofunctional alcohols include: methanol, dimethyl ethanolamine, ethanol, 1-propanol, 2-propanol, 1-butanol, 1-hexanol, 1-decanol, 1-octadecanol, cyclohexanol, 2-phenylethanol, 1-phenoxy-2-propanol, and ethylene oxide/propylene oxide-extended alcohols.

In addition to the monohydric alcohol, a polyhydroxyl compound may also be reacted with the TDI residue satisfying the criteria of the present invention. Any of the known polyhydroxyl compounds may be used, provided that the polyhydroxyl compound does not contribute more than 80% of the number of equivalents of hydroxyl groups present in the hydroxyl group-containing mixture to be reacted with the TDI residue. Particularly suitable polyhydroxyl compounds include polyether polyols, polyester polyols and short chain diols.

Polyether polyols useful in the practice of the present invention typically have functionalities of from about 2 to about 6, preferably from about 2 to about 3, and molecular weights (number average determined by end group analysis) of from about 100 to about 6,000, preferably from about 150 to about 5,000. Examples of such polyether polyols include those obtained in known manner by reacting one or more starting compounds which contain reactive hydrogen atoms with alkylene oxides such as ethylene oxide, propylene oxide, butylene oxide, styrene oxide, tetrahydrofuran, epichlorohydrin or mixtures of these alkylene oxides. Polyethers obtained by addition of ethylene oxide and/or propylene oxide are most preferred. Suitable starting compounds containing reactive hydrogen atoms include polyhydric alcohols (described below as being suitable for preparing polyester polyols); water; methanol; ethanol; 1,2,6-hexane triol; 1,2,4-butane triol; trimethylol ethane; pentaerythritol; mannitol; sorbitol; methyl glycoside; sucrose; phenol; isononyl phenol; resorcinol; hydroquinone; and 1,1,1- or 1,1,2-tris-(hydroxylphenyl)-ethane.

Polyester polyols useful in the practice of the present invention typically have functionalities of about 2 and molecular weights (number average determined by end group analysis) of from about 200 to about 2,000, preferably from about 400 to about 1,000. Examples of such polyester polyols include the reaction products of polyhydric alcohols (preferably dihydric alcohols to which trihydric alcohols may be added) and polybasic (preferably dibasic) carboxylic acids. In addition to these polycarboxylic acids, corresponding carboxylic acid anhydrides or polycarboxylic acid esters of lower alcohols or mixtures thereof may also be used to prepare the polyester polyols useful in the practice of the present invention. The polycarboxylic acids may be aliphatic, cycloaliphatic, aromatic and/or heterocyclic and they may be substituted, e.g., by halogen atoms, and/or unsaturated. Examples of suitable polycarboxylic acids include: succinic acid; adipic acid; suberic acid; azelaic acid; sebacic acid; phthalic acid; isophthalic acid; trimellitic acid; phthalic acid anhydride; tetrahydrophthalic acid anhydride; hexahydrophthalic acid anhydride; tetrachlorophthalic acid anhydride; endomethylene tetrahydrophthalic acid anhydride; glutaric acid anhydride; maleic acid; maleic acid anhydride; fumaric acid; dimeric and trimeric fatty acids such as oleic acid, which may be mixed with monomeric fatty acids; dimethyl terephthalates and bis-glycol terephthalate. Suitable polyhydric alcohols include: ethylene glycol; 1,2- and 1,3-propylene glycol; 1,3- and 1,4-butylene glycol; 1,6-hexanediol; 1,8-octanediol; neopentyl glycol; cyclohexanedimethanol; (1,4-bis(hydroxymethyl) cyclohexane); 2-methyl-1,3-propanediol; 2,2,4-trimethyl-1, 3-pentanediol; triethylene glycol; tetraethylene glycol; polyethylene glycol; dipropylene glycol; polypropylene glycol; dibutylene glycol and polybutylene glycol; and glycerine and trimethylolpropane. The polyesters may also contain a portion of carboxyl end groups. Polyesters of lactones, e.g., ε-caprolactone or hydroxyl carboxylic acids such as ω-hydroxycaproic acid, may also be used.

Short chain diols useful in the practice of the present invention typically have molecular weights of from about 62 to about 400. Examples of suitable diols include: 1,3-butanediol, 1,2-propylene glycol, ethylene glycol, and N-methyl-diethanolamine.

The TDI residue satisfying the criteria of the present invention, a monofunctional alcohol and any optional polyol are reacted in amounts such that the equivalent ratio of isocyanate groups to hydroxyl groups is from about 0.9:1 to about 1:0.9, preferably about 1:1. This reaction may be carried out at temperatures of from about 40° to about 120° C., preferably from about 70° to about 100° C. at atmospheric pressure.

The reaction product is a urethane group containing TDI residue-based composition which is solid at ambient temperature but which is soluble, in most of the commonly used organic solvents (e.g., toluene, methylene chloride and tetrahydrofuran) and in polyisocyanates at ambient temperature. This reaction product may then be dissolved in a polyisocyanate to produce a TDI residue based urethane-filled polyisocyanate. The polyisocyanate in which the urethane group containing TDI residue is dissolved may be any of the known organic diisocyanates or polyisocyanates.

The amount of polyisocyanate in which the urethane group containing TDI residue is dissolved is generally determined on the basis of handling and processing considerations (e.g., viscosity). For most applications, however, the amount of polyisocyanate used is selected so that the dissolved urethane-group containing TDI residue will be present in the polyisocyanate in a quantity of from about 10 to about 50% by weight, based on the total weight of urethane group containing TDI residue plus polyisocyanate.

Diisocyanates and polyisocyanates in which the urethane group containing TDI residue may be dissolved include aliphatic, cycloaliphatic, araliphatic, aromatic and heterocyclic isocyanates, modified isocyanates and isocyanate-terminated prepolymers. Examples of such isocyanates include: diisocyanates such as m-phenylene diisocyanate, p-phenylene diisocyanate, 2,4-toluene diisocyanate, 2,6-toluene diisocyanate, 1,6- hexamethylene diisocyanate, 1,4-hexamethylene diisocyanate, 1,3-cyclohexane diisocyanate, 1,4-cyclohexane diisocyanate, hexahydrotoluene diisocyanate and its isomers, isophorone diisocyanate, dicyclohexylmethane diisocyanates, 1,5-naphthalene diisocyanate, 1-methylphenyl-2,4-phenyl diisocyanate, 4,4'-diphenylmethane diisocyanate, 2,4'-diphenylmethane diisocyanate, 4,4'-biphenylene diisocyanate, 3,3'-dimethoxy4,4'-biphenylene diisocyanate and 3,3'-dimethyl-4,4'-biphenylene diisocyanate; triisocyanates such as 2,4,6-toluene triisocyanate; and polyisocyanates such as 4,4'-dimethyl-diphenyl-methane-2,2',5,5'-tetraisocyanate and the polymethylene polyphenyl-polyisocyanates (polymeric MDI or "PMDI").

Modified isocyanates are obtained by chemical reaction of diisocyanates and/or polyisocyanates. Modified isocyanates useful in the practice of the present invention include isocyanates containing ester groups, urea groups, biuret groups, allophanate groups, carbodiimide groups, isocyanurate groups, uretdione groups and/or urethane groups. Preferred examples of modified isocyanates include prepolymers containing NCO groups and having an NCO content of from about 25 to about 45% by weight, preferably from about 28 to about 38% by weight. Prepolymers based on polyether polyols or polyester polyols and diphenylmethane diisocyanate are particularly preferred. Processes for the production of these prepolymers are known in the art.

The most preferred polyisocyanates for the production of the urethane filled polyisocyanates of the present invention are diphenyl methane diisocyanate (MDI), polymeric MDI, modified MDI, TDI and modified TDI.

To this urethane-filled polyisocyanate is added an epoxide in an amount such that from about 0.5 to about 20% by weight (based on the weight of the TDI residue/alcohol reaction product), preferably from about 1 to about 15% by weight, most preferably from about 5 to about 12% by weight. The resultant mixture may then be heated to a temperature up to 120° C., preferably to a temperature of from about 40° to about 120° C., most preferably to a temperature of from about 60° to about 100° C. for a period of from about 0.1 hr. to about 6 hr., preferably from about 0.5 hr. to about 4 hr., most preferably from about 1 hr. to about 3 hr. to reduce the acid value of the urethane-filled polyisocyanate by at least 30%, preferably by 40%, most preferably, by 50% or more.

In an alternative embodiment of the present invention, an epoxide may be added to the TDI distillation residue/alcohol reaction product before or during the dissolution of that reaction product in a diisocyanate or polyisocyanate. In this embodiment, the epoxide is also added in an amount of from about 0.5 to about 20% by weight (based on the weight of the TDI residue/alcohol reaction product), preferably from about 1 to about 15% by weight, most preferably from about 5 to about 12% by weight. The TDI residue/alcohol reaction product plus epoxide plus diisocyanate and/or polyisocyanate mixture may be heated to a temperature of up to 120° C., preferably a temperature of from about 40° to about 120° C., most preferably a temperature of from about 60° to about 100° C. for a period of up to 6 hr., preferably from about 0.5 hr. to about 4 hr., most preferably from about 1 hr. to about 3 hr. to reduce the acidity of the urethane-filled polyisocyanate by at least 30%, preferably by about 40%, most preferably by about 50% or more.

The acid value or acidity of the urethane-filled polyisocyanate is determined by standard analytical methods such as ASTM D-1638. The method comprises heating the material in a solution of mixed alcohols and titrating the resulting mixture with dilute base. The acidity is reported as a weight percent hydrochloric acid.

The epoxides useful in the practice of the present invention include any chemical compound which contains the epoxide (oxirane) functionality. The term "epoxide" or "epoxy" as used herein refers to any organic compound or resin comprising at least one group comprising a three membered oxirane ring. Preferably two or more oxirane groups are present in the epoxide compound or resin in order to obtain the polyisocyanate compositions with consistent reactivity profiles of the instant invention. The epoxide equivalent weight (EEW) range of suitable epoxides is from about 44 to 400, preferably 100 to 350 and most preferably 150 to 300. Both aromatic and aliphatic polyepoxides may be used, and are well known.

It is somewhat less preferred that the epoxy comprises an aromatic polyepoxide due to the tendency of them to cause yellowing as well as their reduced efficacy. Examples of such aromatic polyepoxides include but are not limited to those selected from the group consisting of the polyglycidyl ethers of polyhydric phenols; glycidyl esters of aromatic carboxylic acids; N-glycidylaminoaromatics such as N-glycidylaminobenzene, N,N,N',N'-tetraglycidyl4,4'-bis-aminophenyl methane, and diglycidylaminobenzene; glycidylamino-glycidyloxyaromatics such as glycidyl-aminoglycidyloxybenzene; and mixtures thereof.

The aromatic polyepoxide resins, comprised of the polyglycidylethers of polyhydric phenols including bis(phenol A), are also less preferred because they contain hydroxyl groups and thus, react with the polyisocyanate mixtures. Thus, this reduces the isocyanate content. Also, less preferred are aliphatic epoxides containing hydroxyl groups, e.g., glycidol, for the same reason. The preferred epoxides for use according to the invention are the aliphatic epoxides which do not contain hydroxyl groups.

Suitable for use are $C_2$–$C_{10}$ aliphatic epoxides such as, for example, ethylene oxide, propylene oxide, 1,2-butene oxide, 2,3-butene oxide (cis and/or trans), isobutylene oxide, 1,2-pentene oxide, 2,3-pentene oxide, cyclopentene oxide, 1,2-hexene oxide, cyclohexene oxide, and the like and mixtures thereof.

Examples of useful aliphatic polyepoxides include but are not limited to those selected from the group consisting of vinyl cyclohexene dioxide; butadiene dioxide; and those containing ether linkages such as trig lycidyl isocyan urate, trig lycidyl pentaeryth ritol, tetraglycidyl pentaerythritol, diglycidylethers of cylcohexane dimethanol and the diglycidylethers of other diols known to those skilled in the art, 1,4-bis(2,3-epoxypropoxy)-benzene; 1,3-bis(2,3-epoxypropoxy)benzene; 4,4'-bis(2,3-epoxypropoxy)-diphenyl ether; 1,8-bis(2,3-epoxypropoxy)octane; 1,4-bis(2,3-epoxypropoxy)cyclohexane; 4,4'-(2-hydroxy-3,4-epoxybutoxy)-diphenyl dimethyl methane; 1,3-bis(4,5-epoxypentoxy)-5-chlorobenzene; 1,4-bis(3,4-epoxybutoxy)-2-chlorocyclohexane; diglycidyl thioether; diglycidyl ether; 1,2,5,6-diepoxyhexane-3; 1,2,5,6-diepoxyhexane; those containing ester groups such as ERL 4221, a product of Union Carbide Corporation, illustrated in U.S. Pat. No. 4,814,103, the disclosure of which is herein incorporated by reference, and mixtures thereof.

Other useful epoxides are listed in, for example, U.S. Pat. No. 3,298,998, the disclosure of which is herein incorporated by reference. These compounds include but are not limited to those selected from the group consisting of bis[p-(2,3-epoxypropoxy)phenyl]cyclohexane; 2,2-bis[p-(2, 3-epoxypropoxy)phenyl]norcamphane; 5,5-bis[(2,3-epoxypropoxy)phenyl]hexahydro4,6-methanoindane; 2,2-bis[4-(2,3-epoxypropoxy)-3-methylphenyl]hexahydro4,7-methanoindane; and 2-bis[p-2,3-epoxypropoxy)phenyl]-methylene-3-methylnorcamphane; and mixtures thereof. Other usable epoxides are found in, for example, Handbook of Epoxy Resin, Lee and Neville, McGraw-Hill, New York (1967) and U.S. Pat. No. 3,018,262, both of which are herein incorporated by reference.

Epoxidized dimer and trimer fatty acids, which are formed by epoxidizing the products of the polymerization of $C_{18}$ unsaturated fatty acids such as oleic acid, linoleic acid, linolenic acid, elaidic acid and the like may also be used in the practice of the present invention. Dimer or trimer fatty acids produce higher molecular weight epoxides that are less likely to volatilize from polyurethanes and polyisocyanurated produced from the urethane-filled polyisocyanates of the present invention. A suitable dimer fatty acid may have an acyclic, monocyclic, or bicyclic structure or comprise a mixture of compounds having different such structures.

Epoxidized mono-, di- and triglycerides prepared by epoxidation of the known unsaturated or partially unsaturated glycerides are preferred. The epoxidized glycerides may be prepared from any of the known fatty acid triglycerides available from natural or synthetic sources. The fatty acid group, which is connected to glycerol by an ester bond is usually a $C_6$–$C_{24}$ monocarboxylic acid (linear or branched; saturated, monounsaturated, or polyunsaturated). Such fatty acids and their equivalents are readily available at low cost from natural sources such as edible triglycerides. Specific illustrative fatty acids suitable for use include, but are not limited to, eicosanoic (arachidic) acid, heneicosanoic acid, docosanoic (behenic) acid, elaidic acid, tricosanoic acid, tetracosanoic (lignoceric) acid, caprylic acid, pelargonic acid, capric acid, caproic acid, lauric acid, palmitic acid, stearic acid, oleic acid, cetoleic acid, myristic acid, palmitoleic acid, gadoleic acid, erucic acid, ricinoleic acid, linoleic acid, linolenic acid, myristoleic acid, eleostearic acid, arachidonic acid, or mixtures or hydrogenated derivatives of these acids. The fatty acids may be derived synthetically or from natural sources such as triglyceride lipids. Mixtures of fatty acid entities, such as the mixtures of fatty acids typically obtained by hydrolysis (splitting) of a triglyceride are also suitable. These fatty acid triglycerides include, but are not limited to, fats and oils such as tallow, soybean oil, cottonseed oil, coconut oil, palm kernel oil, corn oil, fish oil, lard, butterfat, olive oil, palm oil, peanut oil, safflower seed oil, cocoa butter, sesame seed oil, rapeseed oil, sunflower seed oil, as well as fully or partially hydrogenated derivatives and mixtures of these triglycerides. Epoxidized linseed oil is particularly preferred.

The epoxide-treated urethane filled polyisocyanates of the present invention are characterized by their clarity, low viscosity and low acid values as compared to the untreated urethane filled polyisocyanates.

The urethane filled polyisocyanates of the present invention may be used to produce polyisocyanate prepolymers by reacting them with any of the known isocyanate reactive materials. These filled polyisocyanates are preferably reacted with polyols of the type described above as being suitable for use in combination with the monofunctional alcohol to treat the TDI residue in amounts such that the NCO/OH ratio is from about 4:1 to about 34:1 to produce urethane-filled polyisocyanate prepolymers.

Low molecular weight isocyanate-reactive materials may also be used to produce urethane-filled polyisocyanate prepolymers from the urethane filled polyisocyanates of the present invention. Suitable low molecular weight isocyanate-reactive compounds include polyhydric alcohols which have previously been described in the process for the preparation of the polyester polyols and polyether polyols. Dihydric alcohols are preferred.

Monofunctional and even small amounts of trifunctional and higher functional compounds generally known in polyurethane chemistry may be used to produce prepolymers in accordance with the present invention. For example, trimethylolpropane may be used in special cases in which slight branching is desired.

Catalysts, surfactants, blowing agents and additives may be used to aid the polyurethane-forming reaction. Examples of catalysts useful for promoting urethane reactions include tertiary amines, di-n-butyl tin dichloride, di-n-butyl tin diacetate, di-n-butyl tin dilaurate, triethylenediamine, bismuth nitrate. Non-ionic surfactants and wetting agents may also be included in the polyurethane-forming reaction mixture. Examples of suitable blowing agents include: methylene chloride, acetone, pentane, hexane and carbon dioxide. Other suitable additives include: foam stabilizers such as hydrophilic organosilicon compounds, particularly those having a polydimethyl siloxane group attached to a copolymer of ethylene and/or propylene oxide; mineral oil; antistatic agents; plasticizers; fillers; flame retardants; and pigments.

Having thus described our invention, the following Examples are given as being illustrative thereof. All parts and percentages given in these Examples are parts by weight and percentages by weight, unless otherwise indicated.

EXAMPLES

The materials used in the Examples which follow were:
Alcohol A: 1-butanol.
Polyol A: a polyester polyol made from phthalic anhydride and diethylene glycol having an OH Number of 240 which is commercially available under the name Stepanpol PS-2352 from Stepan Chemical Co.
Polyol B: a propylene glycol/propylene oxide/ethylene oxide adduct having 20% terminal ethylene oxide with a functionality of 2 and an OH Number of 28 (Number average molecular weight as determined by end group analysis=4,000).
Epoxy: an epoxidized linseed oil having an epoxide equivalent weight of about 180 which is commercially available from American Chemical Service, Inc. under the name Epoxol 9-5.
Surfactant: a polysiloxane polyether copolymer which is commercially available under the name Tegostab B-84P1 from Goldschmidt Chemical Corporation.
Catalyst A: potassium octoate in diethylene glycol.
Catalyst B: N, N, N',N', N", N"-pentamethyl-diethylenetriamine.
Catalyst C: potassium acetate in ethylene glycol.
Catalyst D: dibutyltin dilaurate.
Catalyst E: a blend of delayed action tin and amine catalysts which is commercially available from Air Products under the name Dabco DC-2.
R-141b: monofluorodichloroethane.
Isocyanate A: a polyisocyanate made up of 44% by weight methylene diphenyl diisocyanate (42% of the 4,4'-isomer and 2% of the 2,4'-isomer) and 56% by weight higher homologs of methylene diphenyl diisocyanate having an NCO content of 31.5%.
TDI RESIDUE: TDI residue generated by phosgenating TDA containing 80% 2,4-TDA and 20% 2,6-TDA and no o-TDA. The monomeric TDI content of the residue was 28.2%, and the total NCO content was 29.0%.

Example 1

300 grams of TDI RESIDUE were introduced into a 500 ml 3-necked flask equipped with a stirrer and thermometer. The TDI RESIDUE was stirred and to this stirred TDI RESIDUE were introduced 153 grams of Alcohol A at 25° C. The resultant mixture was allowed to exotherm to 90° C. and then held at 90° C. until no NCO groups remained (approximately 2 hours). The contents of the flask were then dissolved in 2567 grams of Isocyanate A and then cooled to 25° C. The clear, solids-free liquid product had an NCO content of 26.5%, a viscosity at 25° C. of 1210 mPa·s, and an acidity of 208 ppm.

Example 2

To 1210 grams of urethane-filled isocyanate produced in accordance with Example 1 were added 12.1 grams of Epoxy A. The resultant mixture was heated to 60° C. and maintained at that temperature for 1 hour. The mixture was then cooled to 25° C. The urethane-filled isocyanate product obtained was a clear, solids-free liquid having an NCO content of 26.2%, a viscosity at 25° C. of 1222 mPa·s, and an acidity of 142 ppm.

Example 3

Example 2 was repeated with the exception that 24.2 grams of Epoxy A were added to the isocyanate produced in accordance with Example 1. The urethane-filled isocyanate product obtained was a clear, solids-free liquid having an NCO content of 25.8%, a viscosity at 25° C. of 1290 mPa·s, and an acidity of 123 ppm.

Examples 4–6

A mixture of Polyol A, Surfactant, Catalyst(s), water and R-141b in the amounts indicated (parts by weight=pbw) in Table 1 was added to a quart-sized paper cup. To this mixture was added the isocyanate designated in Table 1 in the amount indicated in Table 1. The contents of the quart-sized paper cup were then mixed at 3,000 RPM for 10 seconds. This mixture was then poured into a one gallon-sized paper cup and the reactivities of the foam which formed were recorded during the rise process. The free rise density was determined after the reaction was complete. The properties of these foams are reported in Table 1.

TABLE 1

| EXAMPLE | 4 | 5 | 6 |
|---|---|---|---|
| POLYOL A, pbw | 28.03 | 27.75 | 27.47 |
| SURFACTANT, pbw | 0.56 | 0.56 | 0.55 |
| WATER, pbw | 0.14 | 0.14 | 0.14 |
| CATALYST A, pbw | 0.38 | 0.38 | 0.38 |
| CATALYST B, pbw | 0.14 | 0.14 | 0.14 |
| CATALYST C, pbw | 0.13 | 0.13 | 0.13 |
| R-141b, pbw | 10.67 | 10.65 | 10.69 |
| EXAMPLE 1 PRODUCT, pbw | 59.95 | — | — |
| EXAMPLE 2 PRODUCT, pbw | — | 60.25 | — |
| EXAMPLE 3 PRODUCT, pbw | — | — | 60.50 |
| Cream Time, sec. | 15 | 14 | 14 |
| Top of Cup, sec | 33 | 31 | 30 |
| String Gel Time, sec | 39 | 39 | 38 |
| Tack Free Time, sec | 100 | 95 | 90 |
| Density, lbs./ft.$^3$ | 2.16 | 2.13 | 2.09 |

Examples 7–9

The isocyanate and polyol mixture (approximately 150 g) described in Table 2 were mixed in the amounts indicated in Table 2 (parts by weight=pbw) in an 8 oz. jar at 23° C. for 1 minute. The jars were then placed in a foam insulated 32 oz. can. The temperature and viscosity were monitored until the viscosity reached 100,000 mPa·s (i.e., the point considered to be the useful pot life). The results are reported in Table 2 and are graphically illustrated in FIG. 1.

TABLE 2

|  | Example 7 | Example 8 | Example 9 |
|---|---|---|---|
| Isocyanate of Ex. 1 (pbw) | 47.2 | — | — |
| Isocyanate of Ex. 2 (pbw) | — | 47.7 | — |
| Isocyanate of Ex. 3 (pbw) | — | — | 48.1 |
| Polyol B (pbw) | 87.0 | 87.0 | 87.0 |
| Diethylene glycol (pbw) | 13.0 | 13.0 | 13.0 |
| Catalyst D (pbw) | 0.904 | 0.004 | 0.004 |
| NCO/OH (equivalent ratio) | 1.05 | 1.05 | 1.05 |
| Time (minutes) | Viscosity (mPa · s)/ Exotherm (°C.) | Viscosity (mPa · s)/ Exotherm (°C.) | Viscosity (mPa · s)/ Exotherm (°C.) |
| 0 | —/23 | —/23 | —/23 |
| 2 | 1,000/27 | 1,000/30 | 1,000/30 |
| 4 | 1,000/29 | 1,000/36 | 1,020/36 |
| 6 | 1,000/32 | 1,120/45 | 1,230/45 |
| 8 | — | 1,720/53 | 1,750/54 |
| 10 | 1050/36 | 3,040/63 | 3,800/64 |
| 12 | 1150/38 | 8,000/69 | 16,000/69 |
| 14 | — | 25,000/72 | 73,000/74 |
| 14.3 | — | — | 100,000/74 |
| 16 | — | 100,000/74 |  |
| 20 | 1490/45 |  |  |
| 30 | 2360/52 |  |  |
| 40 | 4640/55 |  |  |
| 50 | 11,700/56 |  |  |
| 60 | 32,000/57 |  |  |
| 69 | 100,000/57 |  |  |

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A process for the production of a urethane-filled, diisocyanate or polyisocyanate having a reduced acid value comprising
    a) reacting
        1) a toluene diisocyanate residue from the phosgenation of toluene diamine having an ortho-toluenediamine content of less than 0.5% which toluene diisocyanate residue contains at least 10% by weight monomeric toluene diisocyanate and has a total isocyanate group content of at least 20% with
        2) a monofunctional alcohol in amounts such that the equivalent ratio of isocyanate groups in 1) to hydroxyl groups in 2) is from about 0.9:1.0 to about 1.0:0.9,
    b) dissolving the product of a) in a diisocyanate or polyisocyanate, and
    c) reacting from 0.5 to 20% by weight, based on the weight of a), of an epoxide having an epoxide equivalent weight of from about 44 to about 400 with the product of either a) or b) at a temperature of up to 120° C.

2. The process of claim 1 in which the epoxide has an epoxide equivalent weight of from about 100 to about 350.

3. The process of claim 1 in which the epoxide has an epoxide equivalent weight of from about 150 to about 300.

4. The process of claim 1 in which the epoxide is an aliphatic epoxide containing no hydroxyl groups.

5. The process of claim 1 in which the epoxide is an epoxidized linseed oil.

6. The process of claim 1 in which the epoxide is reacted with the product of a) before dissolution in the diisocyanate or polyisocyanate.

7. The process of claim 6 in which the epoxide is reacted with the product of a) at a temperature of from 50° to 120° C. for a period of from 1 to 3 hours before dissolution in the diisocyanate or polyisocyanate.

8. The process of claim 1 in which the epoxide is reacted with the product of b).

9. The process of claim 8 in which the epoxide is reacted with the product of b) at a temperature of from 60° to 100° C. for a period of from 1 to 6 hours.

10. The process of claim 1 in which a polyhydroxyl compound is present during the reaction in an amount such that at least 20% of the total hydroxyl groups present are hydroxyl groups from the monofunctional alcohol.

11. The process of claim 1 in which the monofunctional alcohol has a molecular weight of from about 32 to about 1000.

12. The process of claim 1 in which the monofunctional alcohol has a molecular weight of from about 60 to about 400.

13. The process of claim 1 in which the toluene diisocyanate residue has a total isocyanate group content of at least 25%.

14. The process of claim 1 in which the toluene diisocyanate residue is produced by phosgenation of toluene diamine having an orthoisomer content of less than 0.1%.

15. The process of claim 1 in which the diisocyanate or polyisocyanate used in b) is selected from the group consisting of diphenylmethane diisocyanate, toluene diisocyanate and polyphenyl polymethylene polyisocyanate.

16. The process of claim 1 in which the polyisocyanate used in b) is a polymeric MDI.

17. The clear, reduced acidity urethane-filled polyisocyanate produced by the process of claim 1.

18. The clear, reduced acidity urethane-filled polyisocyanate produced by the process of claim 15.

19. A urethane-filled polyisocyanate prepolymer produced by reacting the polyisocyanate of claim 17 with an isocyanate-reactive compound in an amount such that the NCO/OH ratio is from about 4:1 to about 34:1.

20. A polyurethane produced by reacting the urethane-filled polyisocyanate produced from the process of claim 1 with an isocyanate-reactive compound in an amount such that the NCO/OH ratio is from about 0.8:1 to about 1.2:1.

* * * * *